(12) United States Patent
Heilmann et al.

(10) Patent No.: US 11,347,919 B2
(45) Date of Patent: May 31, 2022

(54) COMPUTER-IMPLEMENTED METHOD FOR GENERATING A MIXED-LAYER FAULT TREE OF A MULTI-COMPONENT SYSTEM COMBINING DIFFERENT LAYERS OF ABSTRACTION

(71) Applicant: SIEMENS INDUSTRY SOFTWARE NV, Leuven (BE)

(72) Inventors: Reiner Heilmann, Egmating (DE); Lennart Kilian, Gauting (DE); Marc Zeller, Munich (DE)

(73) Assignee: SIEMENS INDUSTRY SOFTWARE NV

( * ) Notice: Subject to any disclaimer, the term of this patent is extended or adjusted under 35 U.S.C. 154(b) by 0 days.

(21) Appl. No.: 17/312,459

(22) PCT Filed: Dec. 17, 2019

(86) PCT No.: PCT/EP2019/085650
§ 371 (c)(1),
(2) Date: Jun. 10, 2021

(87) PCT Pub. No.: WO2020/127266
PCT Pub. Date: Jun. 25, 2020

(65) Prior Publication Data
US 2022/0058323 A1 Feb. 24, 2022

(30) Foreign Application Priority Data
Dec. 18, 2018 (EP) ..................................... 18213525

(51) Int. Cl.
*G06F 30/3323* (2020.01)
*G06F 30/3308* (2020.01)
(Continued)

(52) U.S. Cl.
CPC .......... *G06F 30/3323* (2020.01); *G01R 31/28* (2013.01); *G06F 11/00* (2013.01);
(Continued)

(58) Field of Classification Search
CPC ............. G06F 30/3323; G06F 30/3308; G06F 30/367; G06F 30/398; G06F 2119/02; G06F 11/00; G01R 31/28
(Continued)

(56) References Cited

U.S. PATENT DOCUMENTS

| 8,001,059 B2 * | 8/2011 | Takezawa | G06Q 10/06 705/400 |
| 8,346,694 B2 * | 1/2013 | Dugan | G06Q 40/08 706/45 |

(Continued)

FOREIGN PATENT DOCUMENTS

| CN | 103150481 A | * | 6/2013 |
| CN | 103970656 A | * | 8/2014 |

(Continued)

OTHER PUBLICATIONS

International Electrotechnical Commission (IEC) 61508, "Functional Safety of electrical/Electronic/Programmable Electron-ic Safety-related Systems," 1998; 23 pages.
(Continued)

*Primary Examiner* — Phallaka Kik
(74) *Attorney, Agent, or Firm* — Schmeiser, Olsen & Watts LLP

(57) ABSTRACT

A method for generating a fault tree of a multi-component system is provided. The multicomponent system includes a logical-functional system layer and a physical system layer as different layers of abstraction. The physical system layer may correspond, for example, to software and/or hardware implementing the functional aspects of the logical-func-
(Continued)

tional system layer. The method first provides a logical-functional fault tree for the logical-functional system layer and a physical fault tree for the physical system layer, the latter having elements corresponding to elements in the logical-functional fault tree. Next, a mixed-layer fault tree is generated by combining aspects of both fault trees in a systematic way. The disclosed is particularly relevant for analyzing safety-critical systems. However, the present concepts are not limited to these applications and may be applied to general use cases where fault tree analysis is applicable.

11 Claims, 9 Drawing Sheets

(51) Int. Cl.
    *G06F 30/367*     (2020.01)
    *G06F 30/398*     (2020.01)
    *G06F 11/00*     (2006.01)
    *G01R 31/28*     (2006.01)
    *G06F 119/02*     (2020.01)

(52) U.S. Cl.
    CPC ........ *G06F 30/3308* (2020.01); *G06F 30/367* (2020.01); *G06F 30/398* (2020.01); *G06F 2119/02* (2020.01)

(58) Field of Classification Search
    USPC ..... 716/106, 112, 136; 703/16; 714/32, 732, 714/741
    See application file for complete search history.

(56) References Cited

U.S. PATENT DOCUMENTS

| | | | | |
|---|---|---|---|---|
| 8,364,626 | B2* | 1/2013 | Heilmann | G05B 23/0248 706/47 |
| 8,813,025 | B1* | 8/2014 | Hammet | G06F 11/008 717/104 |
| 8,832,657 | B1* | 9/2014 | Cowan | G06Q 10/06 717/124 |
| 10,572,331 | B2 | 2/2020 | Hofig et al. | |
| 10,877,471 | B2* | 12/2020 | Heilmann | G06F 7/38 |
| 11,079,749 | B2* | 8/2021 | Zeller | G05B 23/0248 |
| 2003/0070108 | A1* | 4/2003 | Groen | G06F 11/008 714/1 |
| 2008/0059840 | A1* | 3/2008 | Takezawa | G05B 23/0248 714/37 |
| 2009/0083576 | A1* | 3/2009 | Vlassova | G06F 30/20 714/26 |
| 2009/0144599 | A1* | 6/2009 | Leblond | G06F 11/008 714/752 |
| 2010/0223500 | A1* | 9/2010 | Heilmann | G05B 23/0248 714/26 |
| 2011/0137703 | A1* | 6/2011 | Dugan | G06Q 40/08 705/7.28 |
| 2012/0317058 | A1* | 12/2012 | Abhulimen | G06N 3/0427 706/2 |
| 2013/0073271 | A1* | 3/2013 | Xiang | G06F 11/079 703/6 |
| 2014/0359366 | A1* | 12/2014 | Schwinn | G06N 5/00 714/37 |
| 2015/0067400 | A1* | 3/2015 | Ishii | G06F 11/079 714/37 |
| 2015/0095101 | A1* | 4/2015 | Kymal | G06F 30/00 705/7.28 |
| 2015/0120640 | A1* | 4/2015 | Machida | G06F 11/008 706/52 |
| 2015/0142402 | A1* | 5/2015 | Ramesh | G06F 30/20 703/7 |
| 2015/0193290 | A1* | 7/2015 | He | G05B 23/0248 714/37 |
| 2016/0170868 | A1* | 6/2016 | Hoefig | G06F 11/3684 714/38.1 |
| 2016/0266952 | A1* | 9/2016 | Hofig | G06F 11/0751 |
| 2017/0184654 | A1* | 6/2017 | Toyama | G06F 30/18 |
| 2018/0018209 | A1* | 1/2018 | Hofig | G05B 23/0248 |
| 2018/0074484 | A1* | 3/2018 | Heilmann | G06F 11/008 |

FOREIGN PATENT DOCUMENTS

| | | | |
|---|---|---|---|
| CN | 105022893 A | * | 11/2015 |
| CN | 106226055 A | * | 12/2016 |
| CN | 106980913 A | * | 7/2017 |
| CN | 106991240 A | * | 7/2017 |
| CN | 108956107 A | * | 12/2018 |
| EP | 3270249 A1 | | 1/2018 |

OTHER PUBLICATIONS

Kaiser et al., "Advances in Component Fault Trees," Safety and Reliability Safe Societies in a Changing World, Proceed-ings of ESREL 2018, pp. 815-823, Taylor & Francis (CRC Press), 2018.
EC 60812, "Analysis Techniques for System Reliability—Procedure forFailure Mode and Effects Analysis (FMEA)," 1991 (2006); 7 pages.
Vesely et al., "Fault Tree Handbook," US Nuclear Regulatory Commission, 1981.
Faida Mhenni et al: "Automatie fault tree generation from SysML system models", 2014 IEEE/ASME International Conference on Advanced Intelligent Mechatronics, IEEE, pp. 715-720, XP032628349, DOI: 10.1109/AIM.2014.6878163; [retrieved on Aug. 13, 2014], Seetion III—B Automatie Fault Tree Generation from SysML IBO*; 2014.
PCT International Search Report for Application No. PCT/EP2019/ 085650, dated Apr. 14, 2020.
Kaiser et al., "A New Component Concept for Fault Trees," Proceedings of the 8th Australian Workshop on Safety Critical Systems and Software, vol. 33, pp. 37-46, 2003.

* cited by examiner

COMPUTER-IMPLEMENTED METHOD FOR GENERATING A MIXED-LAYER FAULT TREE OF A MULTI-COMPONENT SYSTEM COMBINING DIFFERENT LAYERS OF ABSTRACTION

CROSS-REFERENCE TO RELATED APPLICATIONS

This application claims priority to PCT Application No. PCT/EP2019/085650, having a filing date of Dec. 17, 2019, which is based off of EP Application No. 18213525.1, having a filing date of Dec. 18, 2018, the entire contents both of which are hereby incorporated by reference.

FIELD OF TECHNOLOGY

The following pertains to a computer-implemented method for generating a mixed-layer fault tree of a multi-component system combining different layers of abstraction. The following further pertains to a device comprising a processor configured to perform such a method. The following particularly pertains to component fault trees.

BACKGROUND

The importance of safety-critical systems is continuously growing in many application domains of embedded systems, such as aerospace, railway, health care, automotive and industrial automation. Thus, along with growing system complexity, the need for safety assurance is increasing in order to guarantee high quality demands in these application domains.

The aim of safety assurance is to ensure that systems do not lead to hazardous situations, which may harm people or endanger the environment. In the application domains of safety-critical systems, safety assurance is defined by the means of standards, see, e.g., International Electrotechnical Commission (IEC) 61508, "Functional Safety of Electrical/Electronic/Programmable Electronic Safety-related Systems," 1998.

Traditionally, the assessment of a system in terms of safety is based on a bottom-up safety analysis approach, such as Failure Mode and Effect Analysis (FMEA), see IEC 60812, "Analysis Techniques for System Reliability—Procedure for Failure Mode and Effects Analysis (FMEA)," 1991. Alternatively, the assessment of a system according to reference implementations is based on top-down approaches such as Fault Tree Analysis (FTA), see, e.g., Vesely et al., "Fault Tree Handbook," US Nuclear Regulatory Commission, 1981. By such techniques, it is possible to identify system failure states, their causes and effects with impact on the system safety.

The decomposition of complex systems into manageable parts is an essential principle when dealing with complex technical systems. However, many safety and reliability modelling techniques do not support hierarchical decomposition in the desired way. FTA offers decomposition into modules, a breakdown with regard to the hierarchy of failure influences rather than to the system architecture. With component fault trees (CFT) a model- and component-based methodology for FTA is provided, which supports a modular and compositional safety analysis strategy, see, e.g., Kaiser et al., "A New Component Concept for Fault Trees," Proceedings of the 8th Australian Workshop on Safety Critical Systems and Software, Volume 33, pp. 37-46, 2003, as well as Kaiser et al., "Advances in Component Fault Trees," Safety and Reliability Safe Societies in a Changing World, Proceedings of ESREL 2018, pp. 815-823, Taylor & Francis (CRC Press), 2018.

In case of CFT, each technical component is represented by an extended fault tree. Besides internal basic failure events and gates (e.g., Boolean AND-gates, OR-gates and so on), each component can have input and output ports. By connecting these ports, components can be integrated into a higher-level system model. All components can be developed independently and stored in separate files or component libraries.

Mathematically, each CFT represents a logical function from its input ports and internal events to its output ports. Using such a methodology of components also within fault tree models offers benefits during the development in industrial practice, for example increased maintainability of the safety analysis model.

In industrial practice, fault trees are often built manually (based on the expert's knowledge) and typically comprise two parts: an upper part based on a functional decomposition of the system, and a lower part representing the technical failure behavior of the system, which may be realized as software and/or hardware.

However, there is no systematic approach to build such fault trees. Thus, in larger and more complex fault trees this mixture of different layers of abstraction may lead to confusion. Moreover, maintenance and evolution of such fault trees (e.g., due to modifications of the system specification) is cumbersome and error-prone.

Model-based approaches on the other hand, which automatically generate fault trees for complex systems, are based on system models, which, according to model-based system engineering approaches, solely represent either the logical/functional or the technical/physical system architecture.

SUMMARY

Against this background, an aspect relates to advanced techniques of analyzing safety-critical systems. In particular, a need exists for systematic approaches to generating fault trees, which can be easily extended, modified and/or reused during a system's life-cycle.

According to a first aspect of embodiments of the invention, a computer-implemented method for generating a mixed-layer fault tree of a multi-component system combining different layers of abstraction is provided. The multicomponent system comprises a logical-functional system layer and a physical system layer. The method comprises providing a logical-functional fault tree for the logical-functional system layer and a physical fault tree for the physical system layer. Each fault tree comprises at least one top failure event, wherein each top failure event in the logical-functional fault tree has a corresponding top failure event in the physical fault tree. Each fault tree further comprises elements associated with components of the multi-component system, wherein each element in the logical-functional fault tree has a corresponding element in the physical fault tree, wherein input failure ports and output failure ports existing in the elements of the logical-functional fault tree have corresponding input failure ports and output failure ports in the physical fault tree. Each fault tree further comprises external interconnections between the elements and the top failure events of each fault tree specifying failure propagation in the respective system layer. The method further comprises generating the mixed-layer fault tree by consecutively performing: adding the top failure events, the elements, including the respective input failure ports and the respective output failure ports, and the external interconnections of the logical-functional fault tree to the mixed-layer fault tree; interconnecting any input failure port within the elements of the mixed-layer fault tree with corresponding output failure ports within each respective element as defined in the logical-functional system layer; adding, for each element in the mixed-layer fault tree, any input failure port and output failure port additionally realized in the corresponding element of the physical fault tree; adding elements additionally realized in the physical fault tree to the mixed-layer fault tree, including respective input failure ports and respective output failure ports; adding external interconnections additionally realized in the physical fault tree to the mixed-layer fault tree; and adding any internal failure behavior from the elements in the physical fault tree not yet realized in the mixed-fault tree.

According to a second aspect of embodiments of the invention, a device is provided. The device comprises a processor configured to perform a method according to embodiments of the invention.

One idea of embodiments of the present invention is to offer a concept of generating (component) fault trees based on model-based failure propagation that employs component fault trees of both the logical/functional system architecture and the physical system architecture. The present approach eases the creation of fault trees being familiar to safety experts and assessors in a systematic way by creating comprehensive component fault trees, which can be easily extended or modified during the life-cycle of a system. Moreover, the creation of the fault trees can be (semi-) automated and parts of the fault trees can be reused.

To this end, embodiments of the present invention provide a mixed-layer fault tree of a multi-component system combining different layers of abstraction, namely a logical-functional system layer and a physical system layer. As a first step, a logical-functional fault tree is provided for the logical-functional system layer in the usual way known to the person of skill.

Next, a physical fault tree for the physical system layer is provided in a similar vein. Then, aspects of both trees are combined into the mixed-layer fault tree. Embodiments of the invention thus follows the common practice of model-based systems engineering, wherein the respective system is modeled on a logical/functional level and on a physical level of abstraction.

The logical/functional architecture of the system can be modeled by using any architecture description language (such as SysML, etc.). On basis of the functional architecture, a logical-functional (component) fault tree is specified to represent failure behavior of the systems' functions as well as the propagation of failures between the functions. The logical-functional fault tree comprises a fault tree element for each function within the logical architecture and one or several top failure events, representing the hazards of the system (as identified for example during a hazard and risk assessment).

External interconnections (possibly including the usual Boolean gates) between the elements and the top failure events specify failure propagation in the logical/functional system layer. Each such element may feature one or several output ports and/or input ports as it is known for CFT. Interconnections of the top failure events and the output ports of the fault tree elements using Boolean gates correspond to the decomposition of hazards to failures of individual functions.

Moreover, the interconnections of the input ports of the CFT elements with the output ports of other CFT elements specify the failure propagation within the functional/logical architecture of the system. Finally, each CFT element may comprise internal failure behavior connecting input/output failure ports within the elements in the usual way, i.e. Boolean gates, basic failure events and/or internal connections. The internal failure behavior thus models the internal decomposition of failures of the functions of the logical-functional layer of the system.

The physical architecture of the system can be modeled using an architecture description language as well (such as SysML, etc.). Moreover, it is specified which functions of the logical-functional layer are implemented by which of the elements of the physical architecture using dependencies between the respective model elements.

Based on these relationships between the functional and the physical architecture, the underlying system analysis model of the physical system architecture is derived from the CFT of the respective functional architecture. A CFT element is created for each element of the physical architecture, wherein:

for each top failure event within the CFT of the functional architecture, a top failure event within the CFT of the physical architecture is created, for each output port as well as for each input port of the CFT elements of the functional architecture implemented by a specific element in the physical architecture, an output/input port is created within the respective CFT element of the physical fault tree, and dependencies are created between the ports/failure events in the functional fault tree and in the physical fault tree.

Next, the physical fault tree may be completed by adding further internal failure behavior particular to the physical layer (basic failure events, Boolean gates and internal interconnections). The resulting physical fault tree represents the failure behavior of the system from a technical/physical point of view.

Based on the functional as well as the physical system architecture and the CFTs defined on these levels of abstraction, a mixed-layer CFT is systematically generated which mixes these two layers into one comprehensive CFT. To this end, the functional aspects from the logical-functional fault tree are first introduced in the mixed-layer fault tree, i.e., top failure events, elements, external interconnections and internal interconnections.

Then, additional aspects from the physical fault tree are added to the mixed-layer fault tree including additional input/output ports, additional elements, additional external interconnections as well as aspects related to the internal failure behavior of the physical layer elements that are independent of the functional layer, i.e., Boolean gates, basic failure events and the corresponding internal interconnections within the elements of the physical layer.

The resulting mixed-layer fault tree combines aspects of both the logical-functional system layer and the physical system layer in a systematic way. This solution separates the logical-functional system layer and the physical system layer, thus offering certain advantages for subsequent amendments and/or updates to the multi-component systems.

According to a third aspect, embodiments of the invention provide a computer program product (non-transitory computer readable storage medium having instructions, which when executed by a processor, perform actions) comprising executable program instructions configured to, when executed, perform the method according to an embodiment of the first aspect.

According to a fourth aspect, embodiments of the invention provide a non-transient computer-readable data storage medium comprising executable program instructions configured to, when executed, perform the method according to an embodiment of the first aspect.

The non-transient computer-readable data storage medium may comprise, or consist of, any type of computer memory, in particular semiconductor memory such as a solid-state memory. The data storage medium may also comprise, or consist of, a CD, a DVD, a Blu-Ray-Disc, an USB memory stick, a memory card (e.g., an SD card) or the like.

According to a fifth aspect, embodiments of the invention provide a data stream representing, or configured to generate, executable program instructions configured to, when executed, perform the method according to an embodiment of the first aspect.

According to an embodiment of the invention, the added internal failure behavior from the elements in the physical fault tree may be interconnected with already realized internal connections in the mixed-fault tree via a Boolean-OR gate.

According to an embodiment of the invention, the physical system layer may correspond to a software and/or hardware realization of the logical-functional system layer.

According to an embodiment of the invention, the mixed-fault tree may be expressed within Boolean algebra by iteratively expanding the mixed-fault tree into Boolean expressions at the elements.

The mixed-fault tree may be expanded from the top failure events, in particular via external and internal interconnections and output/input ports towards the basic events or vice versa.

The accompanying drawings are included to provide a further understanding of embodiments of the present invention and are incorporated in and constitute a part of this specification. The drawings illustrate the embodiments of the present invention and together with the description serve to explain the principles of embodiments of the invention. Other embodiments of the present invention and many of the intended advantages of embodiments of the present invention will be readily appreciated as they become better understood by reference to the following detailed description.

BRIEF DESCRIPTION

Some of the embodiments will be described in detail, with reference to the following figures, wherein like designations denote like members, wherein.

Figure 1:
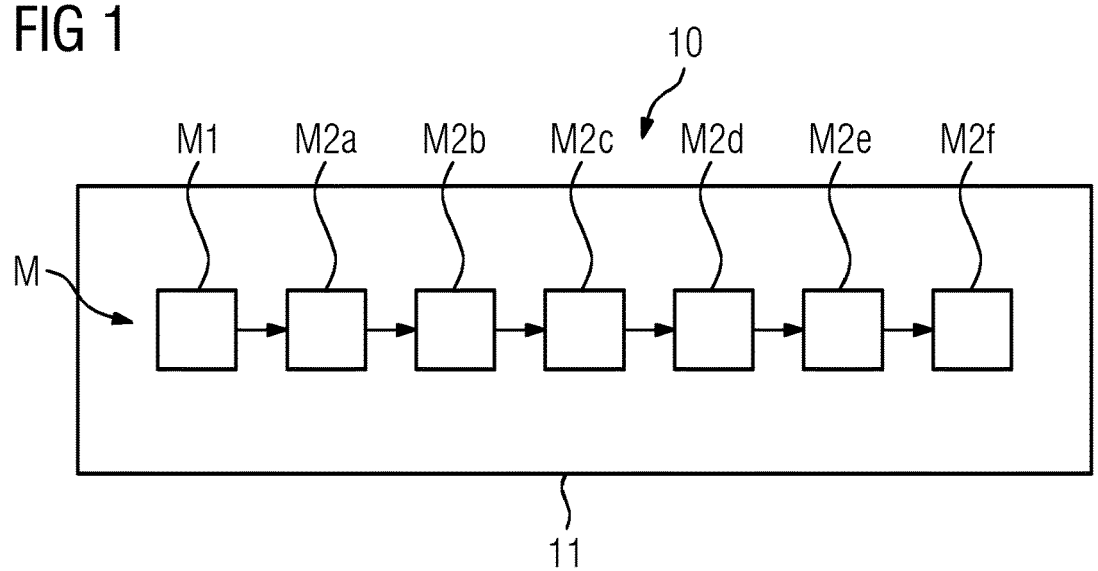
FIG. 1 shows a device with a processor performing a method according to an embodiment of the invention.
Figure 2:
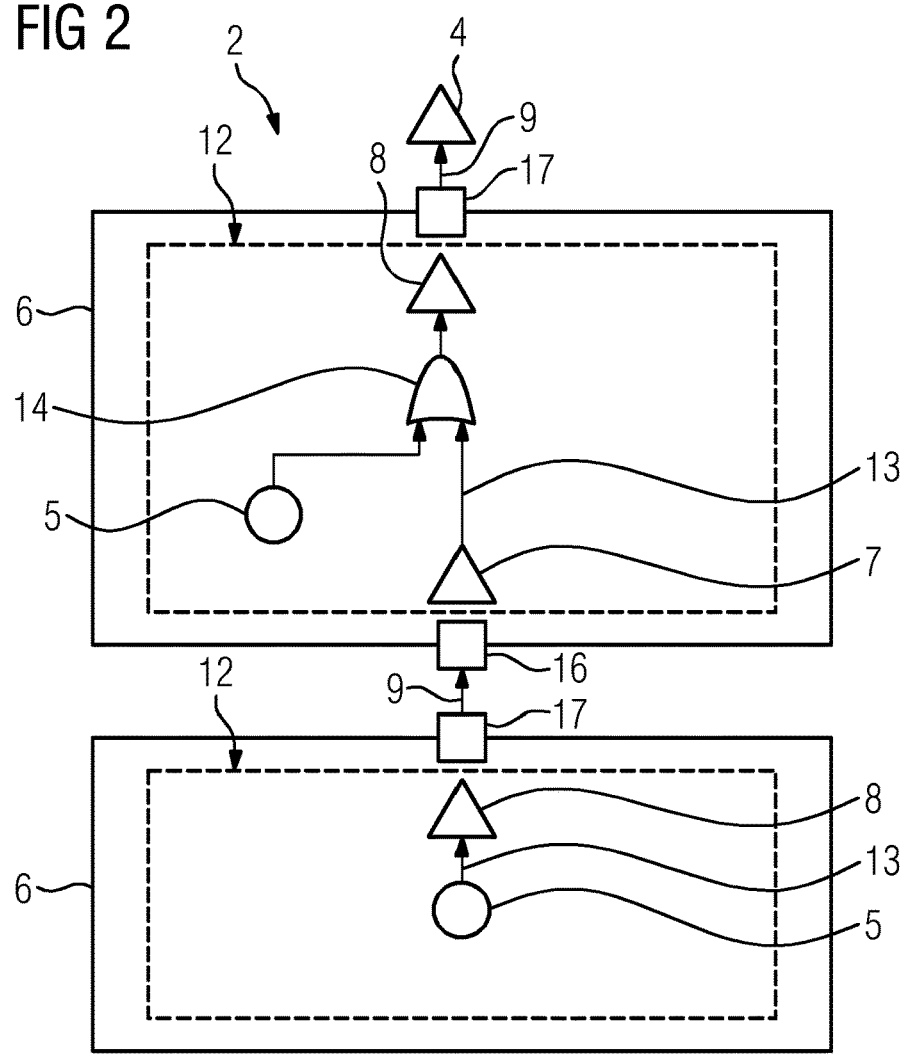
FIG. 2 shows a logical-functional fault tree provided in the method of FIG. 1.
Figure 4:
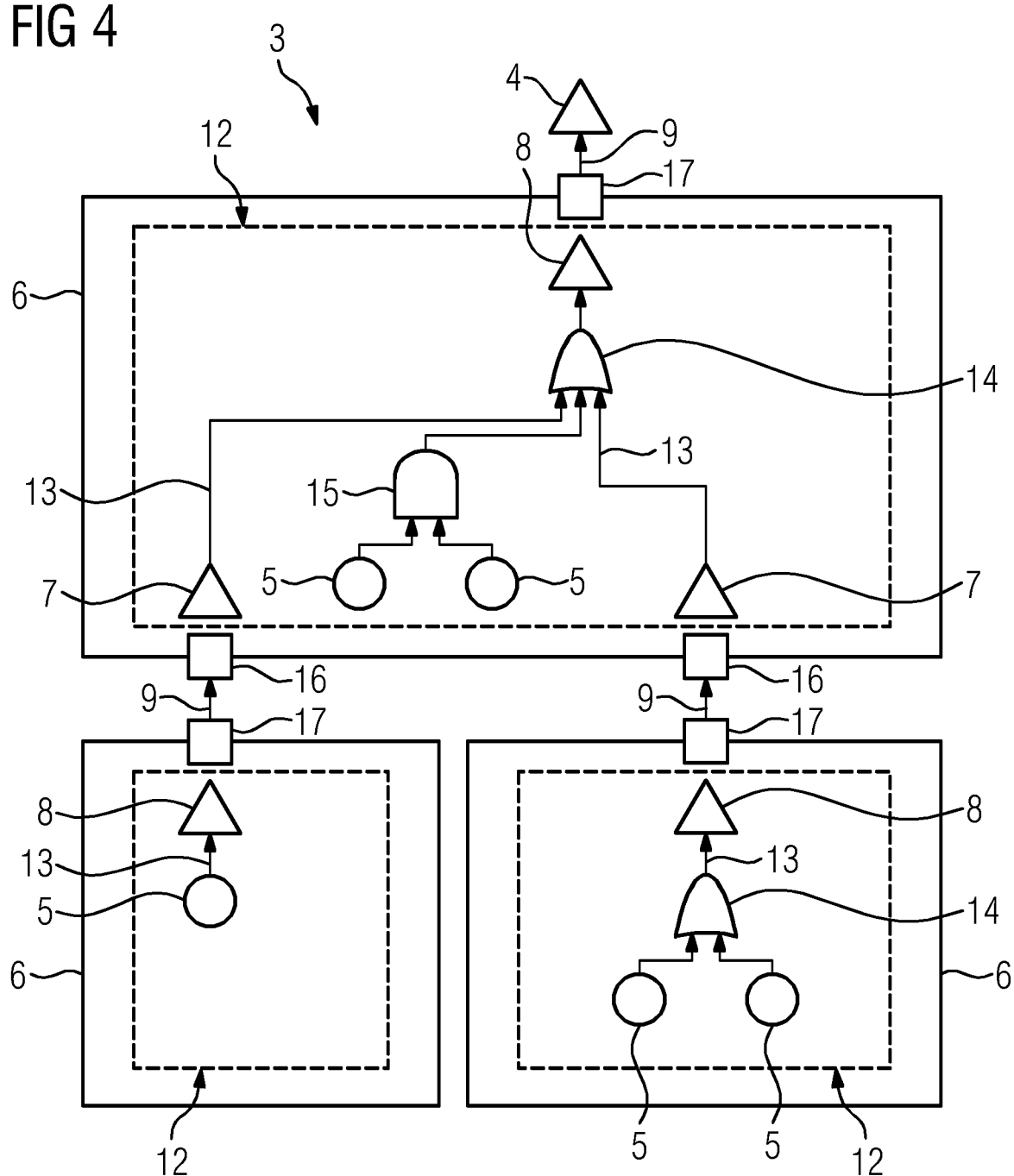
FIG. 4 is a detailed view of the physical fault tree of FIG. 3.
Figure 9:
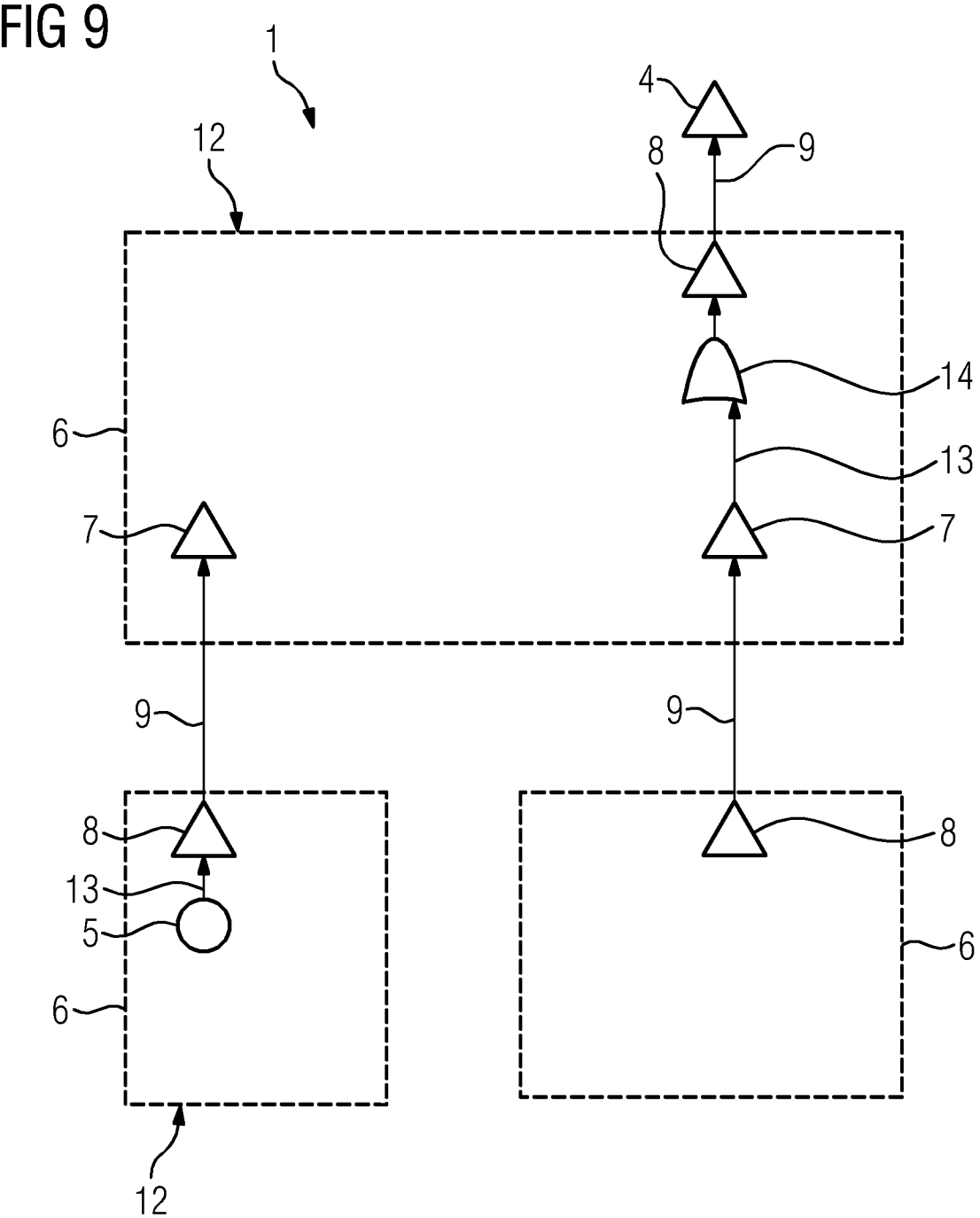
Figure 10:
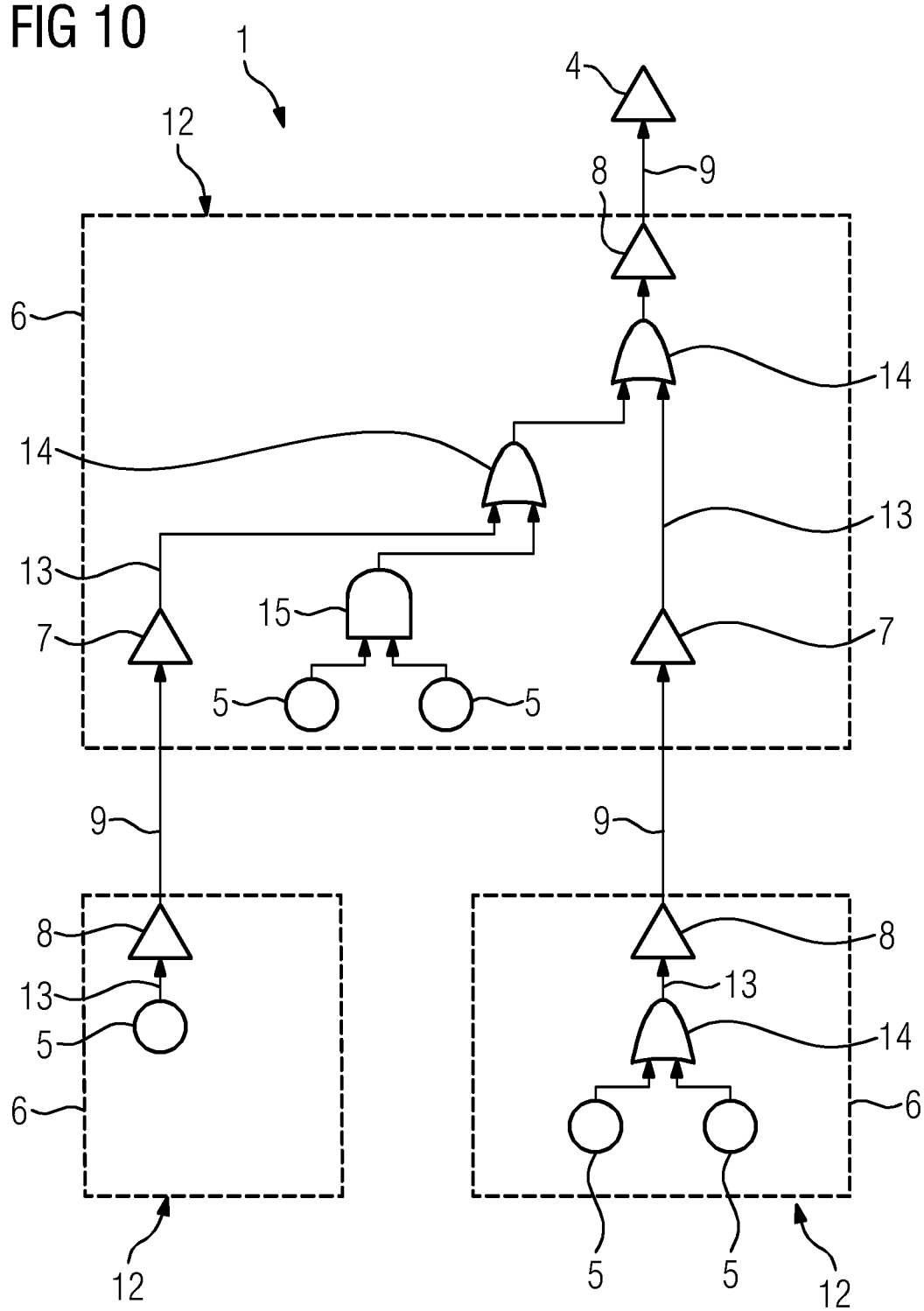

FIG. 9 shows another consecutive step in the generation of a mixed-layer fault tree with the method of FIG. 1 by combining the logical-functional fault tree of FIG. 2 and the physical fault tree of FIG. 4; and FIG. 10 shows another consecutive step in the generation of a mixed-layer fault tree with the method of FIG. 1 by combining the logical-functional fault tree of FIG. 2 and the physical fault tree of FIG. 4.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of embodiments of the present invention. Generally, this application is intended to cover any adaptations or variations of the specific embodiments discussed herein.

Generally, the techniques described herein may find application in various kinds and types of safety-critical systems. For example, the techniques described herein may find application in multi-component system, e.g., control or actuator systems. Such control or actuator systems may provide control functionality or activation functionality for certain machines.

Some elements of multi-component safety-critical systems may be implemented as hardware while some components may alternatively or additionally be implemented using software. It is possible that the safety-critical systems for which the techniques are employed include an output which provides an actuator force or a control signal for actuating or controlling one or more machines.

Specific examples of safety-critical systems which may benefit from the techniques described herein include, but are not limited to, electronic circuitry including active and/or passive electronic components such as transistors, coils, capacitors, resistors, etc.; drivetrains for vehicles such as trains or passenger cars or airplanes; assembly lines including conveyor belts, robots, movable parts, control sections, test sections for inspecting manufactured goods (backend testing); medical systems such as imaging systems including magnetic resonance imaging or computer tomography, particle therapy systems; power plants; etc.

The various examples described herein particularly pertain to component fault trees (CFT). CFTs are described, e.g., in Kaiser et al., "A new component concept for FTs," Proceedings of the 8th Australian Workshop on Safety Critical Systems and Software, Volume 33, pp. 37-46, 2003. CFTs provide a model- and component-based methodology for FT analysis, which supports a modular and compositional safety analysis strategy.

The CFT includes a plurality of elements. The elements are associated with components of the system. The CFT also includes a plurality of interconnections between the elements. The interconnections are associated with dependencies between components of the system. Such dependencies may model input/output of control signals or flow of forces.

The CFT may model an error behavior of the system. The error behavior of the system may be modeled by the CFT using approaches of hierarchical decomposition. Here, the overall behavior of the system can be predicted based on the individual behavior of components. In other words, the causal chain leading to an overall system behavior may be modeled by a causal chain of errors of components.

The CFT may include Boolean interconnections between adjacent elements to model propagation of errors throughout the system. The CFT may model the system using a graph; here nodes of the graph may correspond to the elements and edges of the graph may correspond to the interconnections.

FIG. 1 shows a device 10 with a processor 11 performing a method M according to an embodiment of the invention. The computer-implemented method M generates a mixed-layer fault tree 1 of a multi-component system combining different layers of abstraction of the system. The multi-component system may be, for example, a safety critical system or the like. The method M will be explained in detail with reference to FIGS. 2-4 and 5a-f for one particular example of a mixed-layer fault tree 1.

The mixed-layer fault tree 1 models a multi-component system by combining different layers of abstraction of the system, namely a logical-functional system layer and a physical system layer. The logical-functional system layer represents the functional behavior of the system. The physical system layer on the other hand corresponds to a technical/physical implementation of the logical-functional system layer and may constitute a software-based as well as a hardware-based realization of the functional layer.

The method M comprises under M1 providing a logical-functional fault tree 2 for the logical-functional system layer and a physical fault tree 3 for the physical system layer.

An exemplary logical-functional fault tree 2 is shown in FIG. 2. The logical-functional fault tree 2 comprises a single top failure event 4. However, it will be apparent to the person of skill that other embodiments may feature logical-functional fault trees 2 with a plurality of top failure events 4. The logical-functional fault tree 2 further comprises two exemplary elements 6 associated with components of the multi-component system.

The upper element 6 comprises an output port 17, which is connected to the top failure event 4 via an external interconnection 9. Such external interconnections 9 represent dependencies between the components of the multi-component system and are also called edges in the literature. They exemplify failure propagation between the elements 6 and the top failure events 4. In the particular example of FIG. 2, the external interconnection 9 is a simple line connection. However, the person of skill will readily acknowledge that more complex scenarios are possible, in which several line connections may be connected by various Boolean gates, e.g., Boolean AND-gates, Boolean OR-gates and so on.

The upper element 6 further comprises an input port 16, which is interconnected to an output port 17 of the lower element 6. Both elements 6 comprise an internal failure structure/behavior 12, in which basic failure events 5, internal interconnections 13 and Boolean gates, e.g., a Boolean OR-gate 14, interconnect output failure ports 8 and/or input failure ports 7 in the usual way. In the example of FIG. 2, the lower element 6 only features an output failure port 8, which is the target of an unspecified basic failure event 5.

Figure 3:
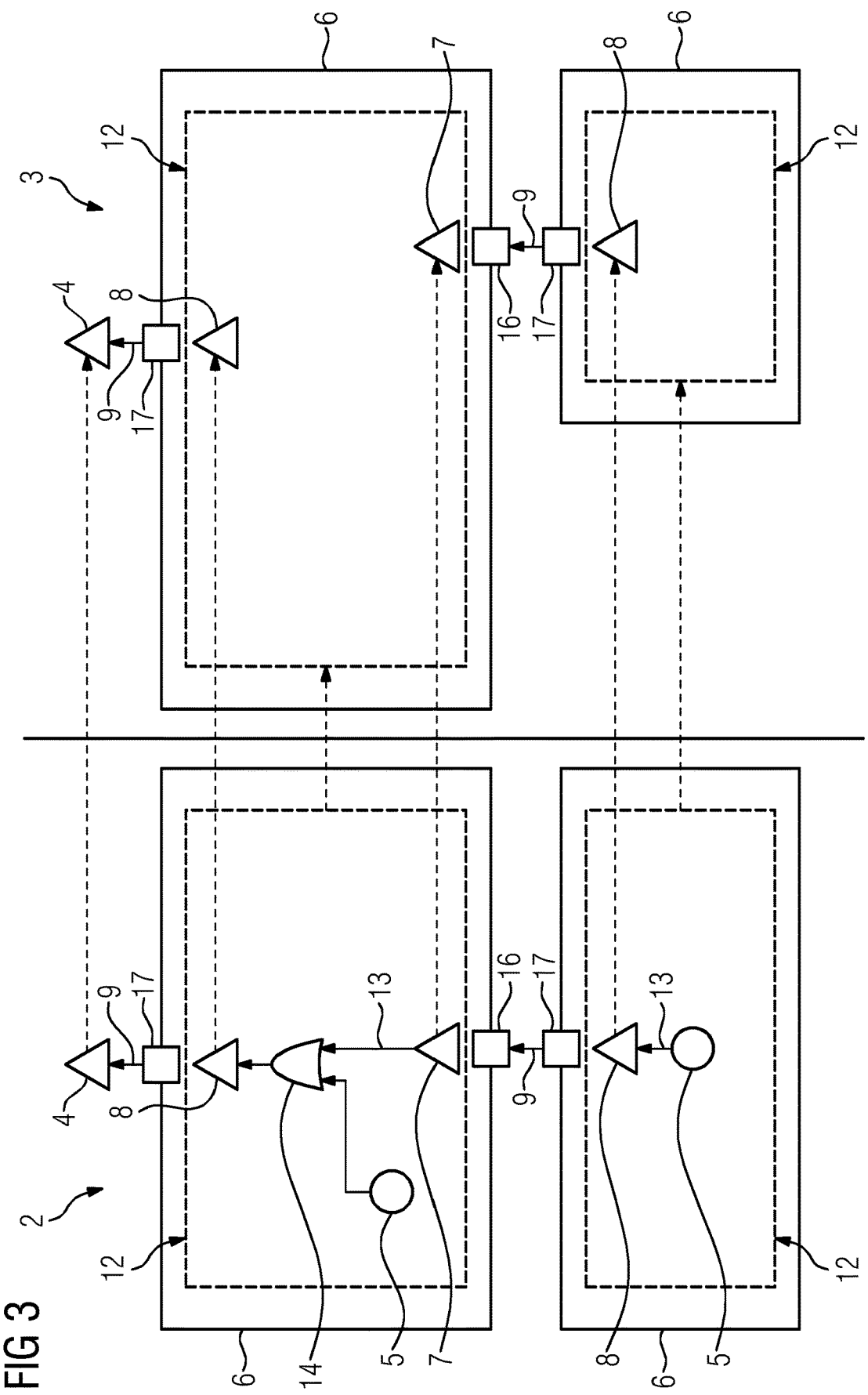
FIG. 3 shows a correspondence between the logical-functional fault tree of FIG. 2 and a physical fault tree provided in the method of FIG. 1.

An exemplary physical fault tree 3 is shown in FIG. 3 together with the corresponding logical-functional fault tree 2 of FIG. 2. It can be seen that each element 6 in the logical-functional fault tree 2 has a corresponding element 6 in the physical fault tree 3, wherein input failure ports 7 and output failure ports 8 existing in the elements 6 of the logical-functional fault tree 2 have corresponding input failure ports 7 and output failure ports 8 in the physical fault tree 3 (see dashed lines between the logical-functional fault tree 2 on the left and the physical fault tree 3 on the right).

However, the physical fault tree 3 comprises additional aspects pertaining to the purely physical aspects of the system not having a functional correspondence. This is demonstrated in FIG. 4, which depicts a detailed view of the physical fault tree 3 including the mentioned additional aspects. As can be seen here, the physical fault tree 3 follows the basic structure of the logical-functional fault tree 2 but comprises an exemplary additional element 6 on the lower left, which is connected to the upper element 6 from output port 17 across external interconnection 9 to input port 16.

For example, the element 6 on the lower left may correspond to a simple power supply, which does not have any functional role in the system. Moreover, the elements 6 contain additional internal failure structure/behavior 12 compared to the corresponding elements 6 in the logical-functional fault tree 2, i.e., additional basic events 5, interconnections 13, Boolean gates, e.g., a Boolean AND-gate 15, and so on.

Figure 5:
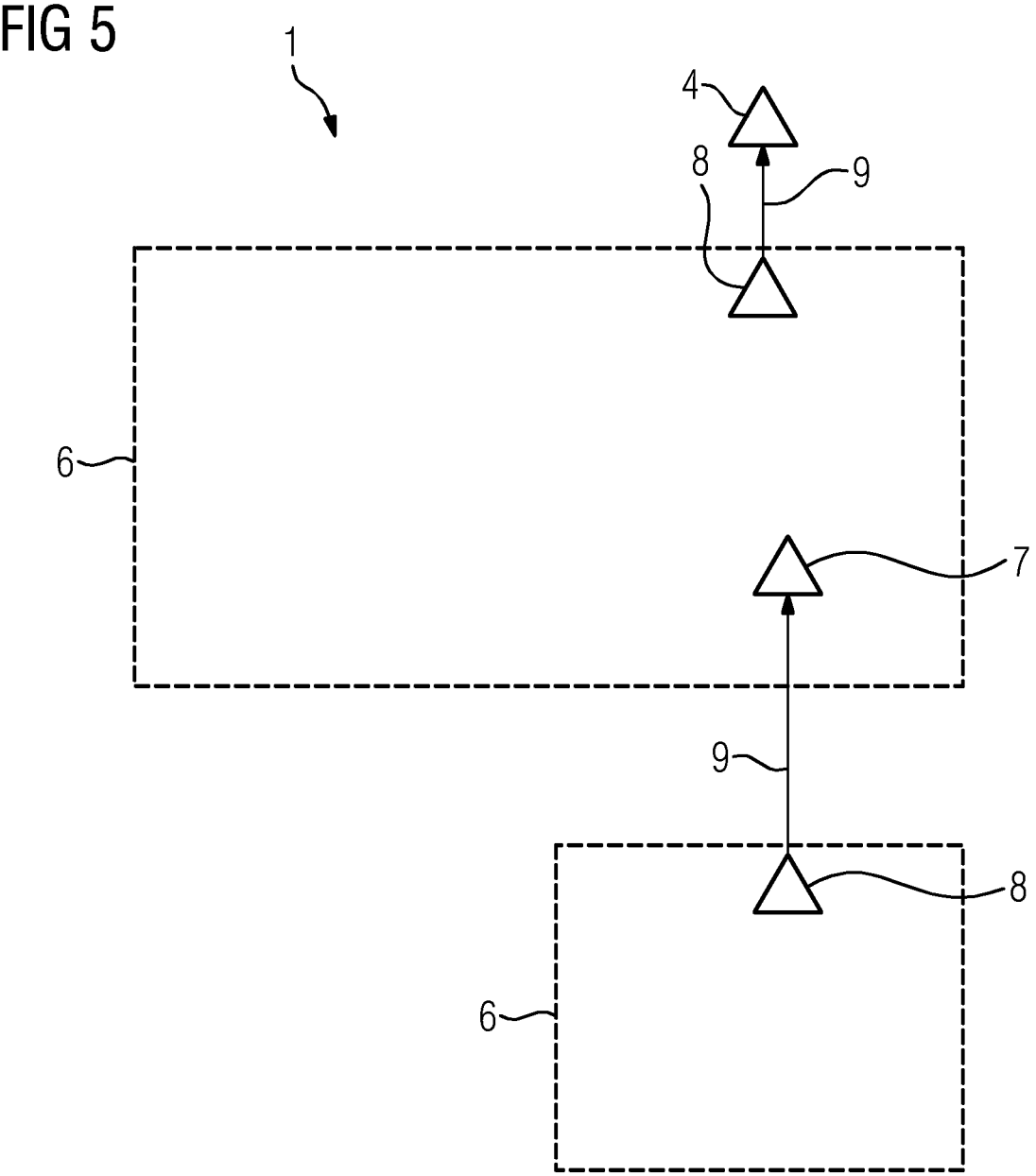
FIG. 5 shows a consecutive step in the generation of a mixed-layer fault tree with the method of FIG. 1 by combining the logical-functional fault tree of FIG. 2 and the physical fault tree of FIG. 4.

Again referring to FIG. 1, the method M further comprises under M2a adding the top failure events 4, the elements 6, including the respective input failure ports 7 and the respective output failure ports 8, and the external interconnections 9 (including any Boolean gates in the logical-functional structure between the elements 6 and between the top failure events 4 and the elements 6) of the logical-functional fault tree 2 to the mixed-layer fault tree 1 (cf. FIG. 5, which depicts the mixed-layer fault tree 1 after this step of the method M).

Hence, at this step of the method M only two elements 6 are added to the mixed-layer fault tree 1, these being the only elements 6 exiting in the logical-functional fault tree 2 of FIG. 2. The top failure event is connected via external interconnection 9 to the output failure port 8 of the upper element 6 (cf. FIG. 5).

Further, the lower right input failure port 7 of the upper element 6 is connected to the output failure port 8 of the lower right element 6. It should be noticed that the lower left element 6 is not yet included in the mixed-layer fault tree 1 at this step of the method M, and thus also not the corresponding output failure port 8 and input failure port 7.

It should be further noticed that the internal failure behavior 12 of the elements 6 in the logical-functional fault tree 2 is not copied over to the mixed-layer fault tree 1.

Figure 6:
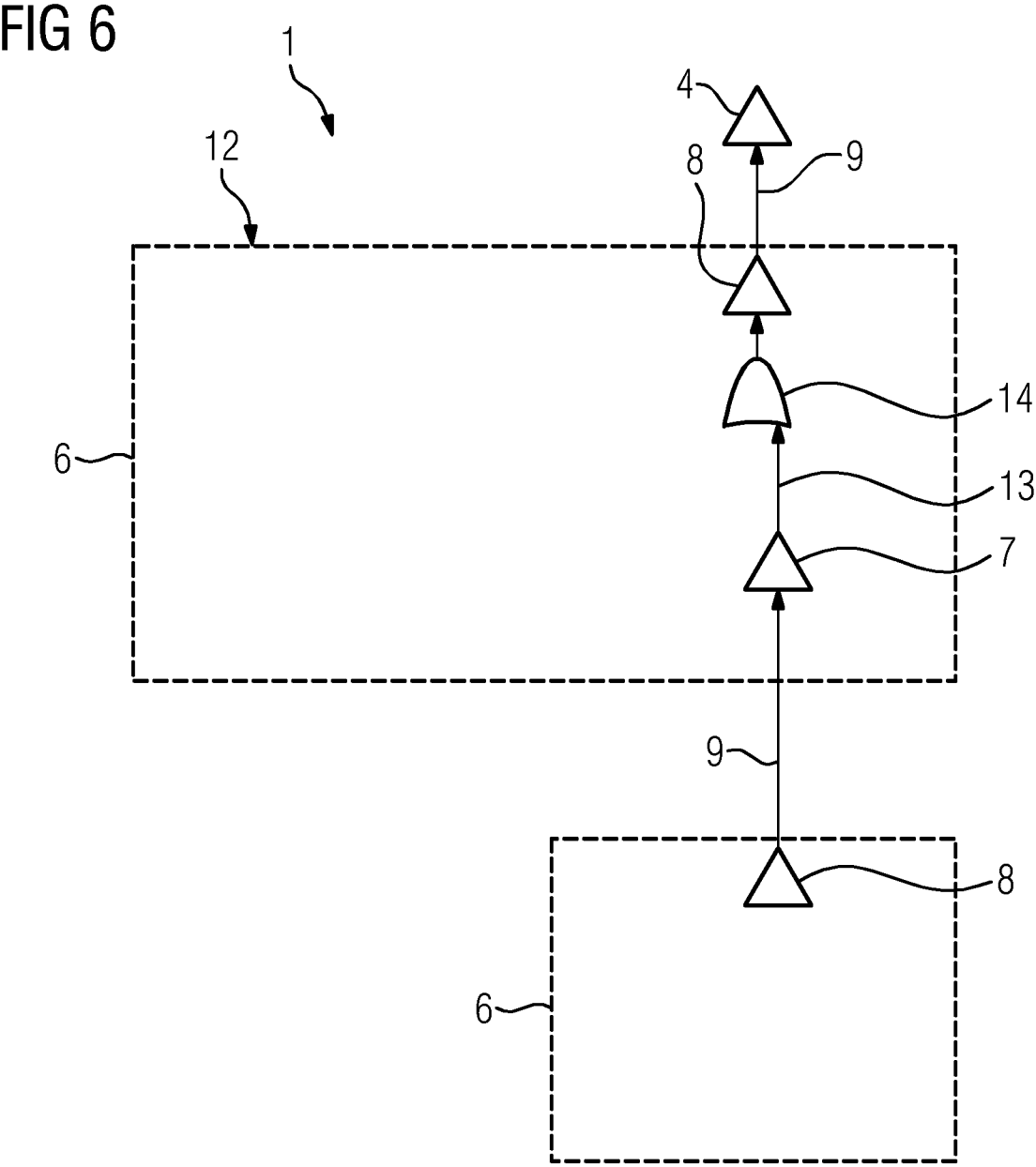
FIG. 6 shows another consecutive step in the generation of a mixed-layer fault tree with the method of FIG. 1 by combining the logical-functional fault tree of FIG. 2 and the physical fault tree of FIG. 4.

The method M further comprises under M2b interconnecting any input failure port 7 within the elements 6 of the mixed-layer fault tree 1 with corresponding output failure ports 8 within each respective element 6 as defined in the logical-functional system layer 2 (cf. FIG. 6, which depicts the mixed-layer fault tree 1 after this step of the method M).

Thus, the output failure port 8 of the upper element 6 in FIG. 5 is connected with the lower right input failure port 7 of the upper element 6 in line with the specification of the logical-functional fault tree 2 of FIG. 2.

Figure 7:
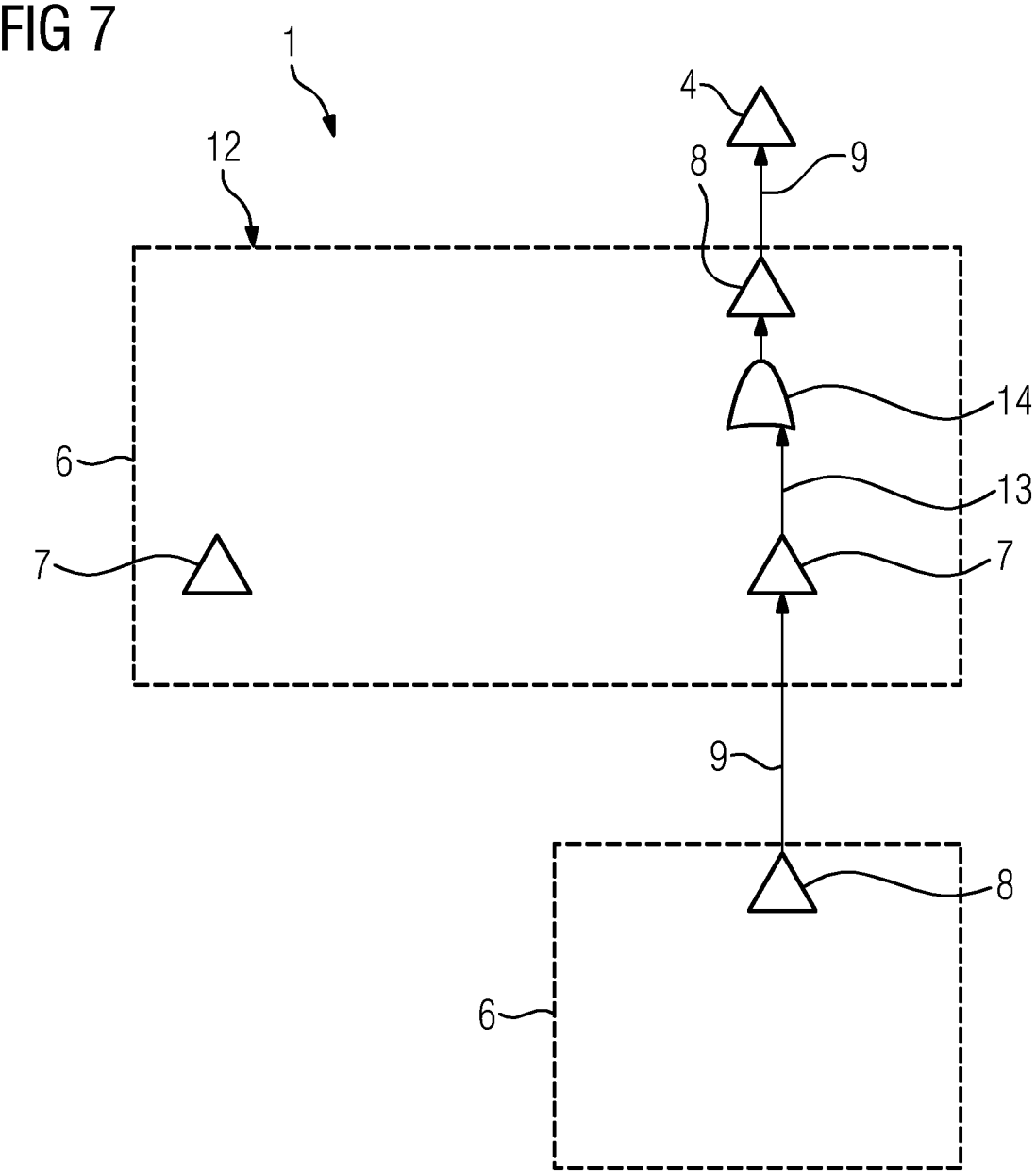
FIG. 7 shows another consecutive step in the generation of a mixed-layer fault tree with the method of FIG. 1 by combining the logical-functional fault tree of FIG. 2 and the physical fault tree of FIG. 4.

The method M further comprises under M2c adding, for each element 6 in the mixed-layer fault tree 1 (i.e., each element 6 existing in the mixed-layer fault tree 1 at this point, that is the upper element 6 and the lower right element 6 in FIG. 6), any input failure port 7 and output failure port 8 additionally realized in the corresponding element 6 of the physical fault tree 3 (cf. FIG. 7).

In the specific example of FIGS. 5a-f, only one input failure port 7 is added to the upper element 6 in FIG. 6, namely the input failure port 7 on the lower left in FIG. 7.

Figure 8:
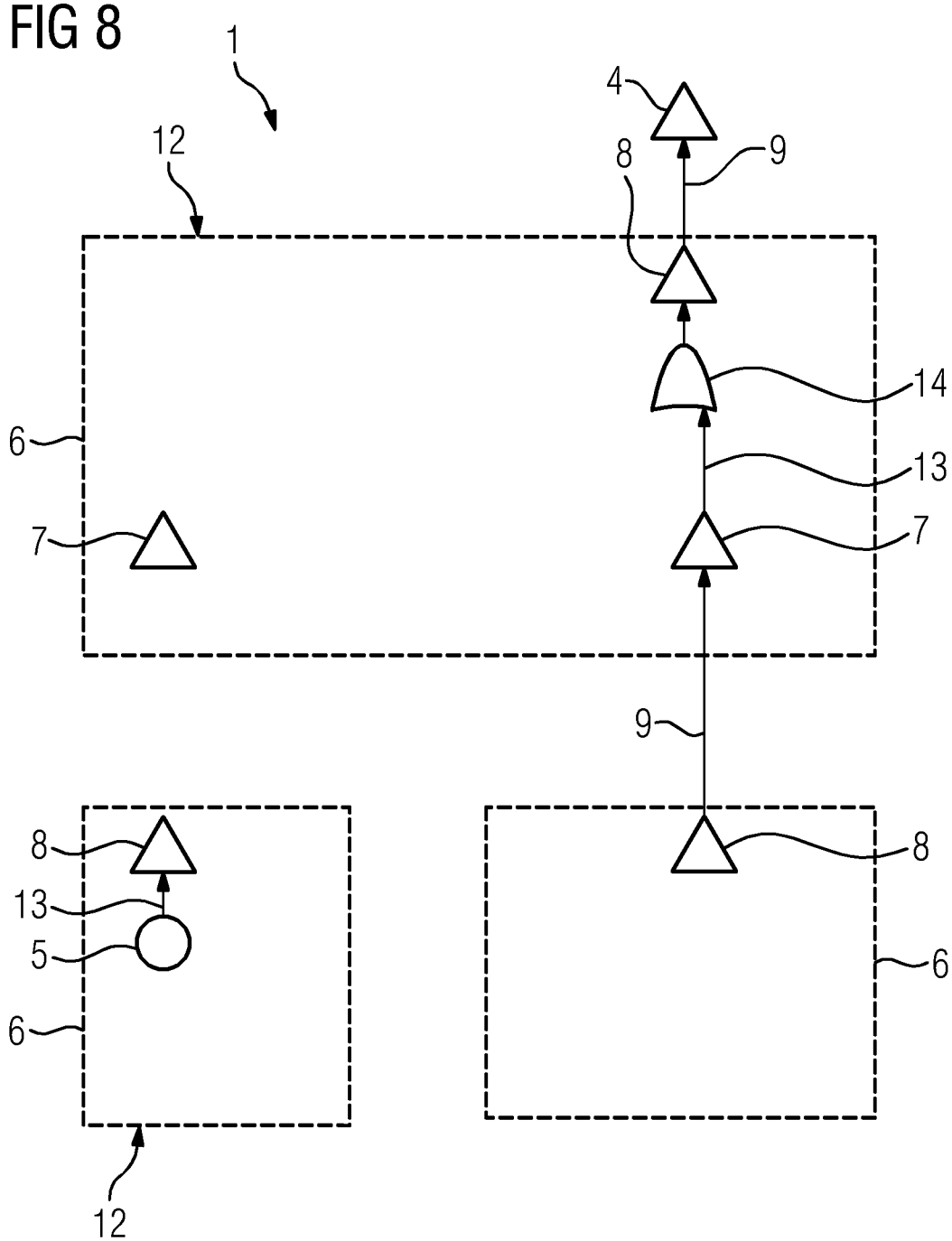
FIG. 8 shows another consecutive step in the generation of a mixed-layer fault tree with the method of FIG. 1 by combining the logical-functional fault tree of FIG. 2 and the physical fault tree of FIG. 4.

The method M further comprises under M2d adding elements 6 additionally realized in the physical fault tree 3 to the mixed-layer fault tree 1, including respective input failure ports 7 and respective output failure ports 8 as well as the corresponding internal failure behavior 12 (cf. FIG. 8). In the specific example of FIGS. 5a-f, only the element 6 on the lower left is added to the mixed-layer fault tree 1 in FIG. 7, including one output failure port 8 being the target of one basic failure event 5.

The method M further comprises under M2e adding external interconnections 9 additionally realized in the physical fault tree 3 to the mixed-layer fault tree 1 (cf. FIG. 9). Thus, in the example of FIGS. 5a-f, one single external interconnection 9 is added between the above element 6 and the lower left element 6 in FIG. 8.

The method M further comprises under M2f adding any internal failure behavior 12 from the elements 6 in the physical fault tree 3 not yet realized in the elements 6 included in the mixed-fault tree 1 from the logical-functional fault tree 3 (i.e., any internal failure behavior 12 not yet included in the upper element 6 and the lower right element 6, compare FIG. 9 and FIG. 4).

Hence, the further aspects of the upper and lower right elements 6 in the physical fault tree 3 of FIG. 4 are added to the elements 6 in FIG. 9 (cf. FIG. 10). The added internal failure behavior 12 from the elements 6 in the physical fault tree 3 is then interconnected with the corresponding output failure ports 8, either directly (lower right element 6) or via a Boolean-OR gate (upper element 6).

As a result, a mixed-layer fault tree 1 is generated that combines both abstract layers of the multi-component system into a single component fault tree, namely the logical-functional layer on the one hand and the technical-physical layer on the other. Next, the mixed-layer fault tree 1 may be evaluated, for example, it can be iteratively expanded into definite Boolean expressions at the elements 6, proceeding from the top failure events 4 via the external and internal interconnections 9, 13 and the output/input ports 8, 7 towards the basic events 5 or vice versa.

The method enables the systematic creation of CFT for a system based on the CFT-descriptions of both the logical/functional system architecture and the technical/physical system architecture. Moreover, the creation of the CFT can be automated using the algorithm described above. This approach eases the creation of FT being familiar to safety experts and assessors by creating comprehensive CFTs, which can be easily extended or modified during the system development life-cycle.

Modifications and extensions can be made at dedicated spots in either the functional/logical layer (modification of the functional decomposition) or the physical/technical layer (technical realizations of the functions by hardware and software) and then a new comprehensive CFT can be (re-)generated automatically.

In contrast to existing manual approaches creating classic FT, parts of the comprehensive, mixed-layer CFT can be reused (e.g., in different projects). Moreover, in case of a modification of the system design not the complete FT must be reviewed and adapted, but the impact of changes is narrowed to specific parts of the CFT model at the respective layer of abstraction. Embodiments of the invention generally provide benefits for assessing large-scale industrial systems.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for generating a mixed-layer fault tree of a multi-component system combining different layers of abstraction, the multicomponent system comprising a logical-functional system layer and a physical system layer, the method comprising:
providing a logical-functional fault tree for the logical-functional system layer and a physical fault tree for the physical system layer, each fault tree having:
at least one top failure event, wherein each top failure event in the logical-functional fault tree has a corresponding top failure event in the physical fault tree,
elements associated with components of the multi-component system, wherein each element in the logical-functional fault tree has a corresponding element in the physical fault tree, wherein input failure ports and output failure ports existing in the elements of the logical-functional fault tree have corresponding input failure ports and output failure ports in the physical fault tree, and
external interconnections between the elements and the top failure events of each fault tree specifying failure propagation in the respective system layer; and
generating the mixed-layer fault tree by consecutively performing:
adding the top failure events, the elements, including the respective input failure ports and the respective output failure ports, and the external interconnections of the logical-functional fault tree to the mixed-layer fault tree,
interconnecting any input failure port within the elements of the mixed-layer fault tree with corresponding output failure ports within each respective element as defined in the logical-functional system layer, adding, for each element in the mixed-layer fault tree, any input failure port and output failure port additionally realized in the corresponding element of the physical fault tree, adding elements additionally realized in the physical fault tree to the mixed-layer fault tree, including respective input failure ports, respective output failure ports and internal failure behavior, adding external interconnections additionally realized in the physical fault tree to the mixed-layer fault tree, and adding any internal failure behavior from the elements in the physical fault tree not yet realized in the elements included in the mixed-fault tree from the logical-functional system layer.

2. The method according to claim 1, wherein the added internal failure behavior from the elements in the physical fault tree interconnected with already realized internal connections in the mixed-fault tree via a Boolean-OR gate.

3. The method according to claim 2, wherein the added internal failure behavior is interconnected with a corresponding output failure port.

4. The method according to claim 1, wherein the added internal failure behavior from the elements in the physical fault tree directly interconnected with already realized internal connections in the mixed-fault tree.

5. The method according to claim 1, wherein the physical system layer corresponds to a software and/or hardware realization of the logical-functional system layer.

6. The method according to claim 1, wherein the mixed-fault tree is expressed within Boolean algebra by iteratively expanding the mixed-fault tree into Boolean expressions at the elements.

7. The method according to claim 6, wherein the mixed-fault tree is expanded proceeding from the top failure events towards the basic events.

8. The method according to claim 6, wherein the mixed-fault tree is expanded proceeding from basic events towards the top failure events.

9. A device comprising a processor configured to perform the method according to claim 1.

10. A computer program product, comprising a computer readable hardware storage device having computer readable program code stored therein, said program code executable by a processor of computer system to implement a method comprising executable program instructions configured to, when executed, perform the method according to claim 1.

11. A non-transient computer-readable data storage medium comprising executable program instructions configured to, when executed, perform the method according to claim 1.

\* \* \* \* \*